United States Patent
Trongone et al.

(10) Patent No.: US 12,437,164 B2
(45) Date of Patent: Oct. 7, 2025

(54) BARCODE SCANNING DEVICES HAVING WIRELESS CHARGING CAPABILITIES

(71) Applicant: ZEBRA TECHNOLOGIES CORPORATION, Lincolnshire, IL (US)

(72) Inventors: Eric Trongone, Coram, NY (US); Roland Wing Fai Lee, Jericho, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/141,067

(22) Filed: Apr. 28, 2023

(65) Prior Publication Data
US 2024/0362431 A1    Oct. 31, 2024

(51) Int. Cl.
G06K 7/00    (2006.01)
G06K 7/10    (2006.01)

(52) U.S. Cl.
CPC ....... G06K 7/0008 (2013.01); G06K 7/10881 (2013.01)

(58) Field of Classification Search
CPC .......................... G06K 7/0008; G06K 7/10881
USPC .................................................... 235/462.45
See application file for complete search history.

(56) References Cited

U.S. PATENT DOCUMENTS

| | | | |
|---|---|---|---|
| 2014/0239892 A1* | 8/2014 | Sawa | H02J 50/12 320/108 |
| 2020/0160013 A1* | 5/2020 | Klicpera | H02J 50/90 |
| 2021/0011158 A1 | 1/2021 | Nagalla et al. | |
| 2021/0111580 A1* | 4/2021 | Barkan | G06K 7/10881 |

* cited by examiner

Primary Examiner — Daniel A Hess
(74) Attorney, Agent, or Firm — Yuri Astvatsaturov (57) ABSTRACT

Barcode reader and cradle assemblies for inductive charging include a reader for capturing at least one image of an object and a cradle that retains the reader. The reader includes a head portion including an opening at least partially defining the FOV, a handle portion, a foot portion forming a tapered foot region, a rechargeable power source coupled with the reader to be electrically charged and to supply an electric charge to power the reader, and a first coil positioned within or around the tapered foot region coupled with the rechargeable power source. The cradle includes a body portion including a tapered body region and a second coil positioned therewithin or therearound that generates an oscillating electromagnetic field in response to an alternating current. The tapered foot region removably couples with the tapered body region to retain the reader. When the reader is retained within the cradle, at least one of the first or second coils is nested within the other of the coils.

18 Claims, 8 Drawing Sheets

BARCODE SCANNING DEVICES HAVING WIRELESS CHARGING CAPABILITIES

BACKGROUND

Industrial scanners and/or barcode readers may be used in warehouse environments and/or other environments and may be provided in the form of mobile scanning devices. These scanners may be used to scan barcodes and other objects. Such scanners are typically contained within a chassis to ensure optical components are protected from bumps, falls, and/or other potentially damaging events. Barcode and other scanning devices generally capture images within a given field of view. In some instances, handheld barcode reader assemblies include a reader that is selectively positioned by a user to assist with capturing a suitable image of an item. Such readers are typically used in conjunction with cradles and/or stands that receive a portion of the reader. Charging of a handheld reader traditionally is achieved via direct electrical contact with the stand, which may be directly connected to an external electrical source or may include a battery.

However, traditional charging approaches may have several notable drawbacks. If incorrectly placed, direct contact between the electrical contacts on the reader and the cradle may not occur, and the reader may not charge. The electrical connections can be difficult to clean, which is particularly problematic in a healthcare environment. Further, the electrical connections are not sealed to water, dust, and electrostatic discharge (ESD) and are subject to repetitive cycling failure.

Some of the challenges associated with traditional charging approaches are addressed by providing inductive charging systems for handheld barcode reader assemblies. Such inductive charging systems are typically in the form of flat coils carried by the reader and the cradle that are positionable in proximity to each other when the reader and the cradle are coupled together. However, inductive charging may present different problems. With traditional contact-based systems in handheld barcode reader assemblies, the contacts are either connected, or they are not, so when the user receives some sort of feedback (e.g., hearing the stand chirp or seeing the stand flash lights), the user knows the reader is charging. However, when the coils in an inductive charge system are coupled, they may not be aligned in a way that results in efficient charging. This means that even though the user might place the reader in the stand and hear or see a positive indication that charging is occurring, inefficient coupling may not achieve the maximum charge rate that is required and/or desired.

Such an inefficient charge rate may be of particular concern for barcode reader assemblies using inductive charging where the stand is in the form of a presentation cradle. In presentation cradles, the reader is configured to be "always-on" and scanning for the presence of an object. If the reader believes an object is present, it will continually try to scan, resulting in high power consumption. Should a user place the reader into the cradle in a misaligned orientation, they may return to find that the reader is dead and not usable for the next transaction due to inefficient charging.

Accordingly, there is a need for improved accessories having improved functionalities.

SUMMARY

Barcode reader and cradle assemblies for inductive charging are disclosed herein that include a reader for capturing at least one image of an object appearing in an imaging field of view (FOV) and a cradle for selectively retaining the reader. The reader includes a head portion including an opening at least partially defining the FOV, a handle portion coupled with the head portion, a foot portion coupled with the handle portion, the foot portion forming a tapered foot region, a rechargeable power source coupled with the reader and adapted to be electrically charged and to supply an electric charge to power the reader, and a first coil positioned within or around the tapered foot region, the first coil being coupled with the rechargeable power source. The cradle includes a body portion including a tapered body region and a second coil positioned within or around the tapered body region. The second coil is adapted to generate an oscillating electromagnetic field in response to an alternating current applied across the second coil. The tapered foot region of the foot portion of the reader is adapted to removably couple with the tapered body region of the body portion of the cradle to retain the reader such that when the reader is retained within the cradle, at least one of the first coil or the second coil is nested within the other of the second coil or the first coil. The first coil is adapted to carry an induced current in response to being exposed to the oscillating electromatic field, whereby the induced current carried through the first coil being used to electrically charge the rechargeable power source.

In some examples, the tapered body region of the cradle defines an insertion axis. The first coil and the second coil each extend at an oblique angle relative to the insertion axis when the reader is retained within the cradle. In some examples, the first coil lines at least a portion of a wall of the tapered foot region.

In some forms, the tapered foot region of the foot portion of the reader and the tapered body region of the body portion of the cradle form a nesting arrangement when coupled together. In these and other examples, the tapered foot region of the foot portion of the reader is adapted to nest within the tapered body region of the body portion of the cradle. In yet other examples, the tapered body region of the body portion of the cradle is adapted to nest within the tapered foot region of the foot portion of the reader.

In some approaches, the barcode reader and cradle assembly may further include a first coil retention member adapted to retain the first coil against a sidewall of the tapered foot region. In some examples, the first coil includes a solid ferrite core.

In some forms, the second coil and the first coil cooperate to transmit an electrical charge of at least approximately 75% efficiency across a supplied power output between approximately 2 W and 5 W.

In accordance with a second aspect, a barcode reader and cradle assembly for inductive charging includes a reader for capturing at least one image of an object appearing in an imaging field of view (FOV) and a cradle for selectively retaining the reader. The reader includes a handle portion, a foot portion coupled therewith, a head portion coupled with the handle portion, a rechargeable power source coupled with the reader, and a first coil. The head portion includes an opening at least partially defining the FOV and a tapered head region extending around a periphery of the opening. The rechargeable power source is adapted to be electrically charged and to supply an electric charge to power the reader. The first coil is positioned within or around the tapered head region, and is coupled with the rechargeable power source. The cradle includes a body portion including a tapered body region and a second coil positioned within or adjacent to the tapered body region. Further, the second coil is adapted to generate an oscillating electromagnetic field in response to an alternating current applied across the second coil. The tapered head region of the head portion of the reader is adapted to removably couple with the tapered body region of the body portion of the cradle to retain the reader such that when the reader is retained within the cradle, at least one of the first coil or the second coil is nested within the other of the second coil or the first coil. The first coil is adapted to carry an induced current in response to being exposed to the oscillating electromatic field, the induced current carried through the first coil being used to electrically charge the rechargeable power source.

In accordance with a third aspect, a reader for capturing at least one image of an object appearing in an imaging field of view (FOV) includes a head portion including an opening at least partially defining the FOV, a handle portion coupled with the head portion, a foot portion coupled with the handle portion, a rechargeable power source coupled with the reader and adapted to be electrically charged and to supply an electric charge to power the reader, a tapered region formed on at least one of the head portion or the foot portion, and a first coil adapted to be positioned within or adjacent to the tapered region. The first coil is coupled with the rechargeable power source. The tapered region is adapted to removably couple with a cradle to retain the reader therewith, whereupon the first coil carries an induced current in response to being exposed to an oscillating electromatic field. The induced current carried through the first coil is used to electrically charge the rechargeable power source.

In accordance with a fourth aspect, an adapter plate attachable to a cradle for selectively retaining a barcode reader includes a body portion including a tapered body region and a cradle coupling region adapted to couple with a portion of a cradle and a coil positioned within or around the tapered body region. The coil generates an oscillating electromagnetic field in response to an alternating current applied thereacross. The tapered body region of the body portion of the cradle is adapted to removably couple with a tapered region of the reader to retain the reader such that when the reader is retained within the cradle, a nesting arrangement is formed with the tapered body region of the body portion.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, a barcode reader and cradle assembly is provided that provides secure and efficient charging. More specifically, in some arrangements, a barcode reader is provided that includes a tapered foot portion that is nestable with a corresponding tapered cavity portion of a cradle. Notably, each of the tapered portions accommodate respective inductive coils to transmit an electrical charge. Such a nesting arrangement will assist in proper placement of the reader with respect to the cradle, thereby improving charging speeds and allowing for high-power implementations to be used.

Turning to the figures, as shown in FIGS. 1-8, a barcode reader and cradle assembly 100 for inductive charging includes a reader 102 and a cradle 140. The reader 102 includes a head portion 106, a handle portion 110, and a foot portion 114. The head portion 106 includes an opening 106*a* that at least partially defines a field of view (FOV) via an imaging system 108 having any number of components (e.g., lenses and/or lens arrays, sensors, controllers, aiming systems, illumination systems, and the like).

The handle portion 110 of the reader 102 may be in the form of an elongated member that a user may grasp with their hand to manipulate the reader 102. The handle portion 110 includes a trigger 111 that is engageable by the user to activate the imaging system 108 and/or any other system or components to capture at least one image appearing in the FOV.

A rechargeable power source 112 is provided that may be disposed within the handle portion 110. In some examples, the rechargeable power source 112 may be disposed in the head portion 106, the foot portion 114, or may be partially disposed in any number of these portions. In yet other examples, the rechargeable power source 112 may be positioned externally to the reader 102 while being operably coupled therewith. The rechargeable power source 112 is adapted to be electrically charged and to supply an electric charge to power the reader 102. It is to be appreciated that the rechargeable power source 112 may take any number of forms and/or chemical compositions such as, for example Nickel-Cadmium, Nickel-Metal Hydride, and/or Lithium Ion. Other examples are possible.

The foot portion 114, or the base of the reader 102, includes a tapered foot region 116. In the illustrated examples, the tapered foot region 116 has a generally larger cross-sectional dimension in the direction closer to the handle portion 110 than the cross-sectional dimension at a distal end thereof. Further, in these examples, the tapered foot region 116 is in the form of male member that protrudes outwardly from the handle portion 110. However, in other examples, the opposite configuration may be possible whereby the tapered foot region extends inwardly into the foot portion of the reader in a tapered female arrangement (not illustrated).

A first coil 120 is positionable within or around (e.g., internally or externally) the tapered foot region 116. More specifically, in the illustrated examples, the first coil 120 lines or is disposed adjacent to an interior surface of a wall 117 of the tapered foot region 116. However, it is to be appreciated that in other examples, the first coil 120 may be disposed adjacent to an exterior surface of the wall 117. In some examples, the first coil may be wire wound any number of times and may have a ferrite core. In some examples, the first coil 120 may have a coil diameter (or similar outer dimension) between approximately 15 mm and approximately 25 mm and a coil height between approximately 8 mm and approximately 13 mm. Other examples are possible.

Figure 5:
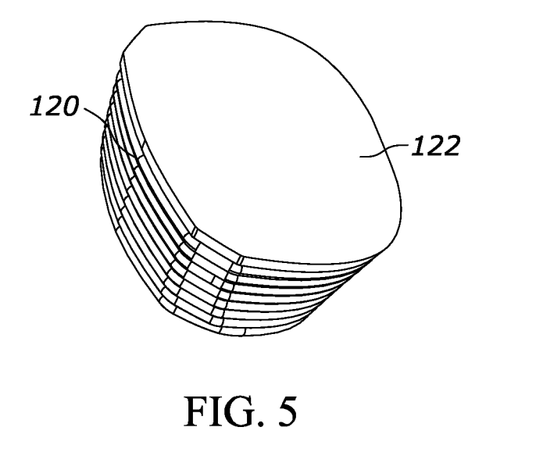
FIG. 5 illustrates a first example inductive coil arrangement for use with the assembly of FIGS. 1-4 in accordance with various embodiments.
Figure 6:
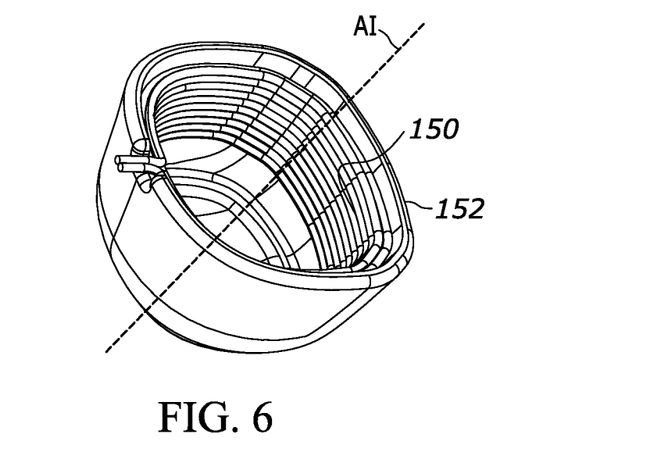
FIG. 6 illustrates a perspective view of a second example inductive coil arrangement for use with the assembly of FIGS. 1-4 in accordance with various embodiments.

The first coil 120 may be carried by a first coil base 122. In some examples, the first coil 120 may be wound or otherwise wrapped about the first coil base 122, whereupon the first coil base 122 may be inserted into the tapered foot region 116 of the reader 102 such that the first coil 120 is positioned adjacent to the wall 117. As illustrated in FIG. 5, the first coil base 122 has a tapered arrangement that coincides with the tapered arrangement of the tapered foot region 116. By wrapping the first coil 120 around this tapered member, the first coil 120 forms a tapered configuration. In some examples, the first coil base 122 may include any number of channels, grooves, or other guides to assist with proper placement of the first coil 120 thereon.

In any of these arrangements, the first coil 120 is coupled with the rechargeable power source 112 to provide an electrical charge thereto. More specifically, and as will be discussed below, the first coil 120 may carry an induced current in response to being exposed to an oscillating electromagnetic field that is used to electrically charge the rechargeable power source 116.

Figure 1:
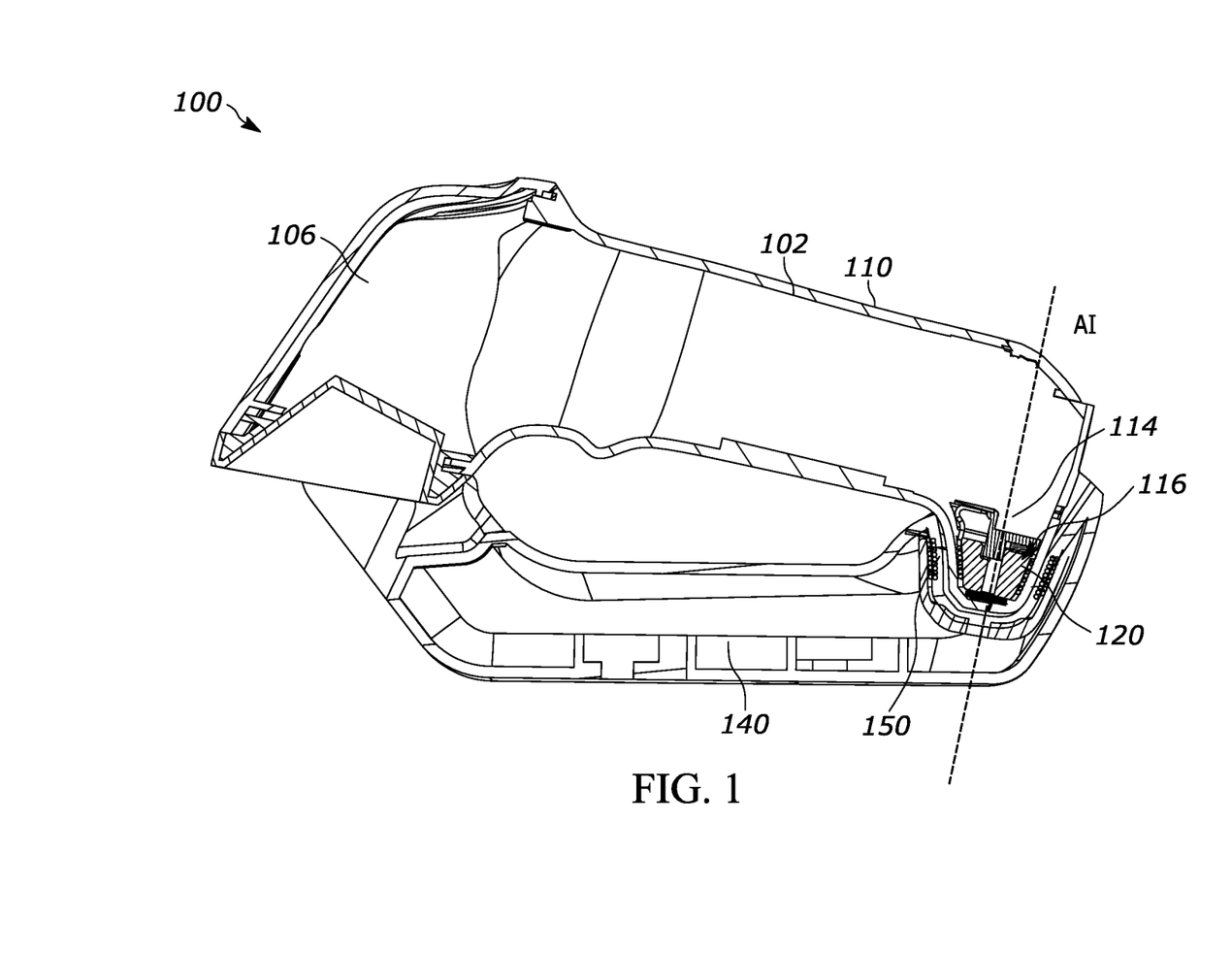
FIG. 1 illustrates a side elevation cross-sectional view of an example barcode reader and cradle assembly in accordance with various embodiments.
Figure 2:
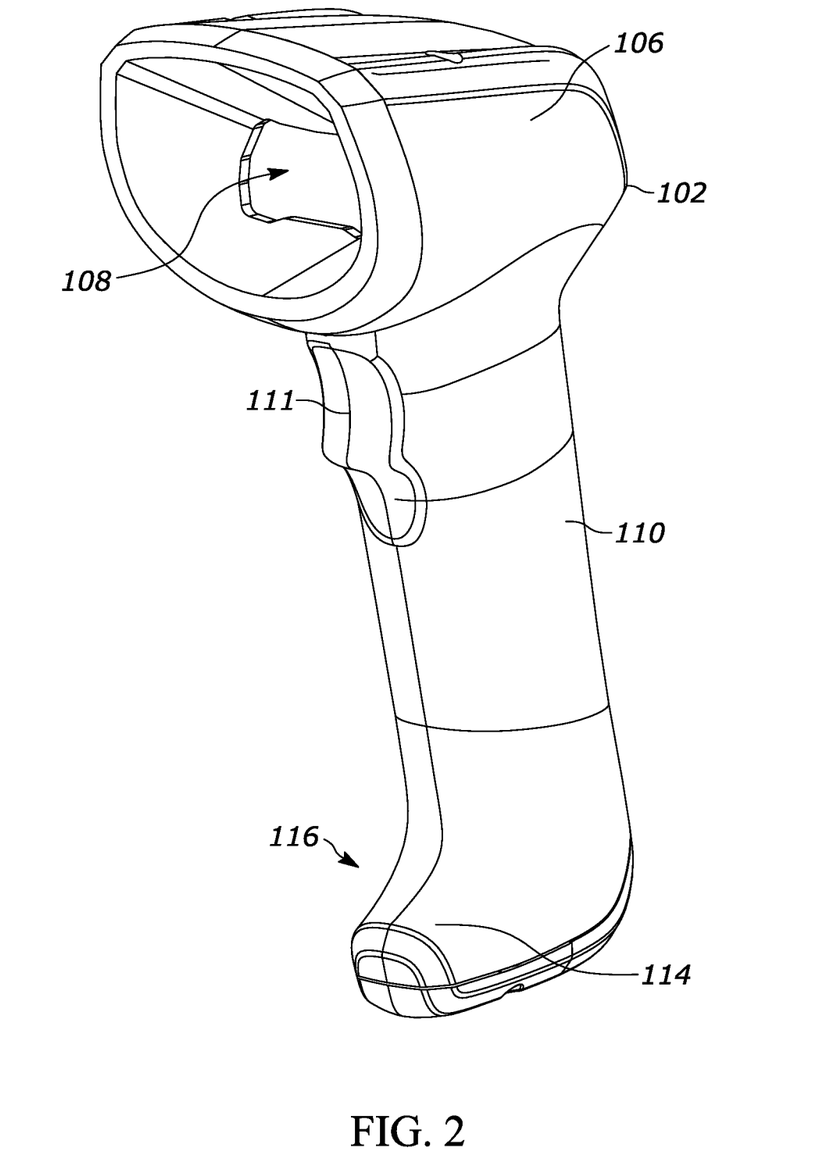
FIG. 2 illustrates a perspective view of an example barcode reader for use with the assembly of FIG. 1 in accordance with various embodiments.
Figure 3:
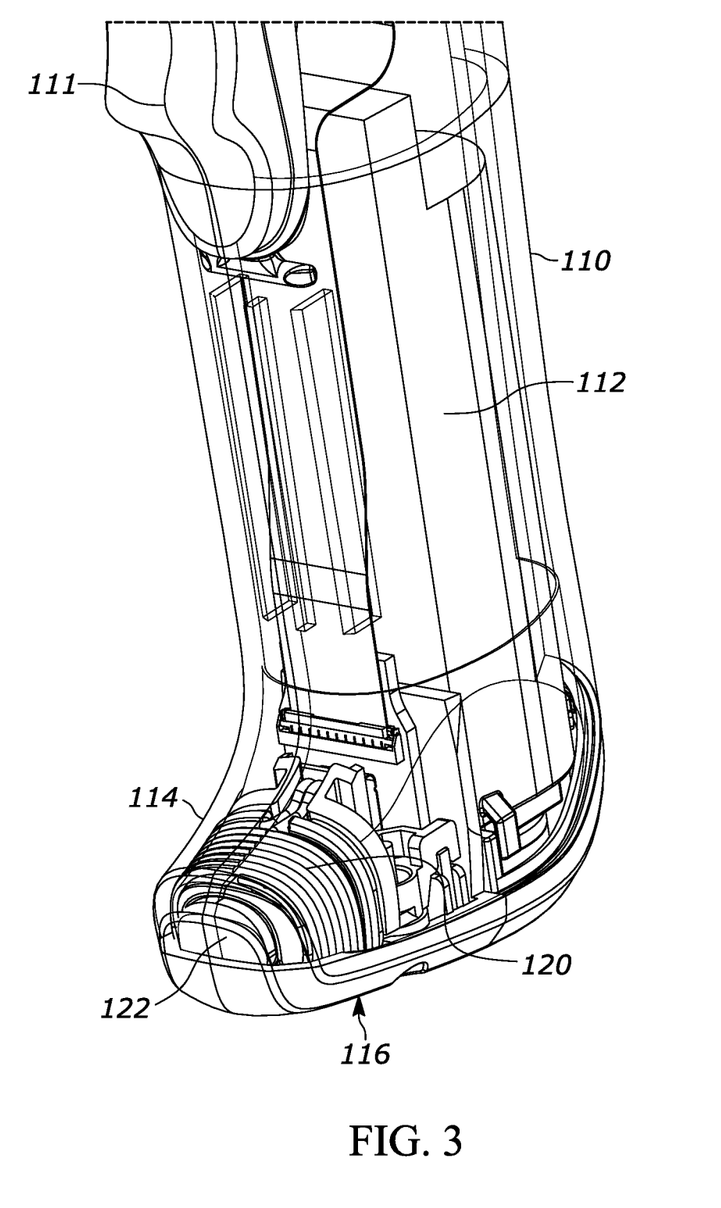
FIG. 3 illustrates a perspective view of an example handle and foot portion of the example barcode reader of FIG. 2 in accordance with various embodiments.
Figure 4:
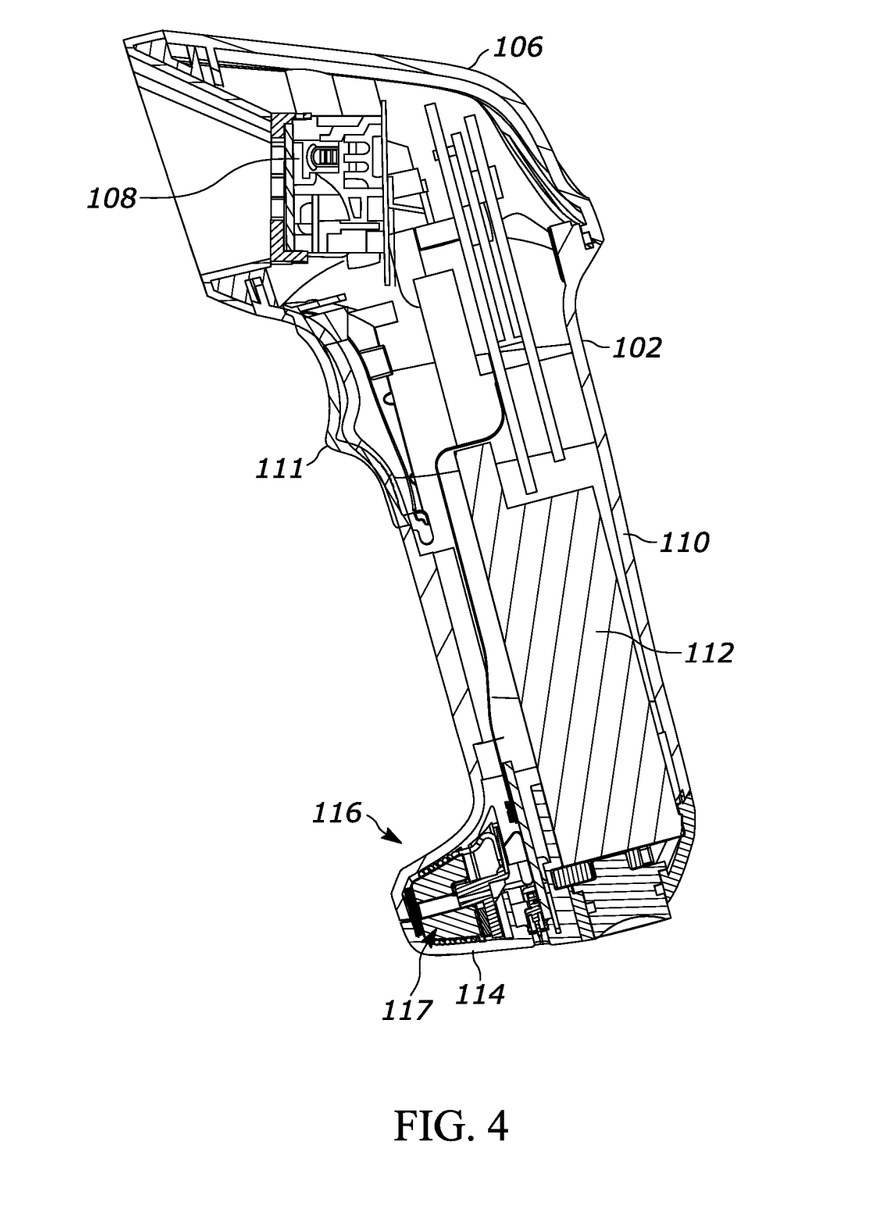
FIG. 4 illustrates a side elevation cross-sectional view of the example barcode reader of FIGS. 2 & 3 in accordance with various embodiments.
Figure 9:
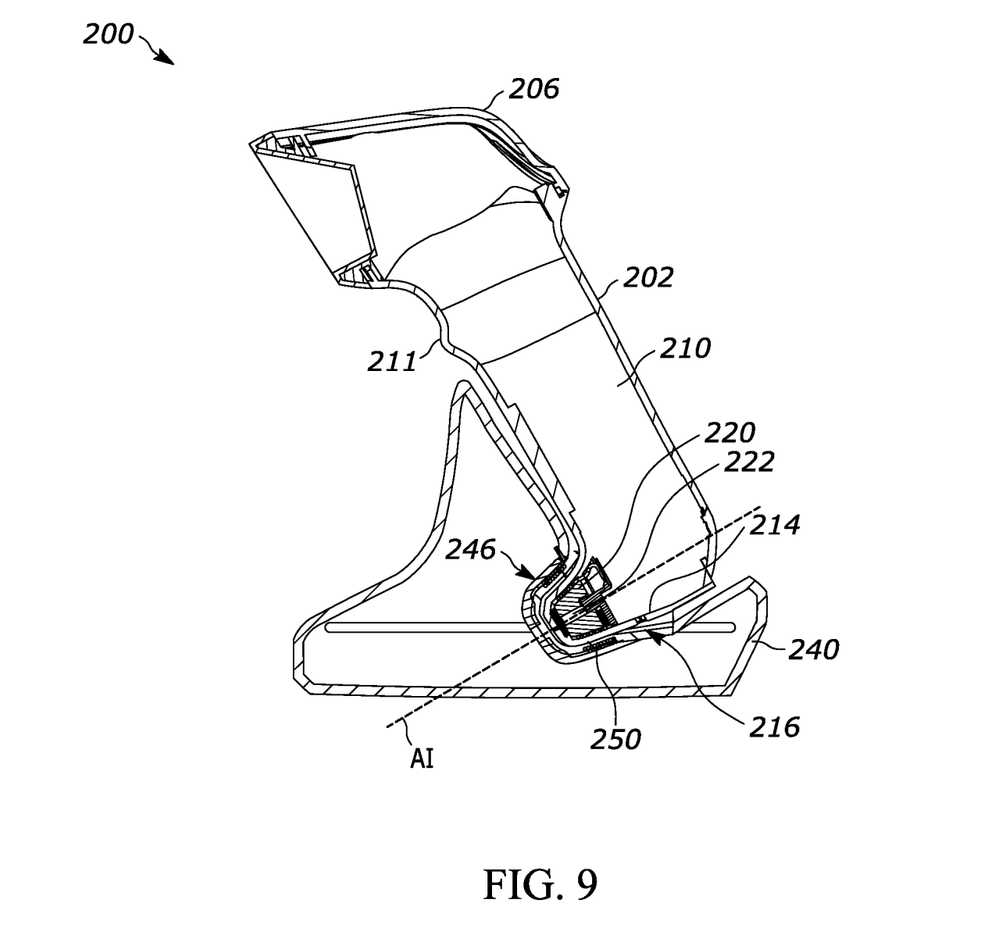
FIG. 9 illustrates a side elevation cross-sectional view of an alternative barcode reader and cradle assembly in accordance with various embodiments.

The cradle 140 is provided to selectively retain and charge the reader 102. The cradle 140 includes a body 141 that defines a tapered body region 146. It is to be appreciated that the cradle 140 may take any number of desired forms to accommodate placement of the reader in a generally horizontal orientation (e.g., as illustrated in FIG. 1), a generally vertical (e.g., as illustrated in FIG. 9) orientation, or any other desired orientation. Generally, the tapered body region 146 is provided to receive a portion (e.g., the tapered foot region 116) of the reader 102. The tapered body region 146 defines an insertion axis "Ai". It is to be appreciated that the cradle 140 may include any number of additional or alternative cavities to assist with positioning and/or aligning the reader 102 thereon or otherwise coupling the reader 102 therewith.

In the illustrated examples, the tapered body region 146 has a generally female arrangement whereby the cross-sectional dimension of the opening adjacent to an outermost surface is generally larger than the cross-sectional dimension that is disposed within the body portion 141. However, in other examples, the opposite configuration may be possible where the tapered body region 146 protrudes outwardly from the body region 141 in a tapered, male arrangement.

A second coil 150 is positionable within or around (e.g., internally or externally) the tapered body region 146. More specifically, in the illustrated examples, the second coil 150 lines or is disposed adjacent to an interior surface of a wall 147 of the tapered foot region 146. However, it is to be appreciated that in other examples, the second coil 150 may be disposed adjacent to an exterior surface of the wall 147. In some examples, the second coil 150 may be wire wound any number of times. In some examples, the second coil 150 may have a coil diameter (or similar outer dimension) between approximately 25 mm and approximately 40 mm and a coil height between approximately 20 mm and approximately 30 mm. Other examples are possible.

Figure 7:
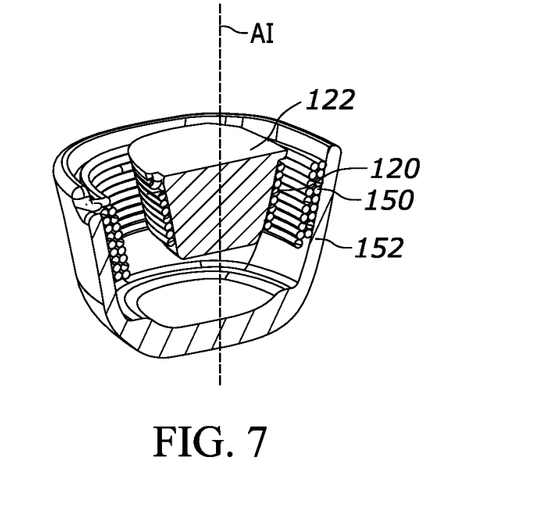
FIG. 7 illustrates a perspective cross-sectional view of the first and second example inductive coil arrangements of FIGS. 5 & 6 in a nested arrangement in accordance with various embodiments.

With particular reference to FIG. 7, in some examples, the second coil 150 may be carried by a second coil base 152. In some examples, the second coil 150 may be wound or otherwise wrapped within or about the second coil base 152. In some examples, the second coil base may be provided as a retrofit kit that couples with an existing cradle to provide an upgradeable assembly. As illustrated in FIG. 7, the second coil base 152 has a tapered arrangement. In some examples, the second coil base 152 may include any number of channels, grooves, or other guides to assist with proper placement of the second coil 150 thereon.

Figure 8:
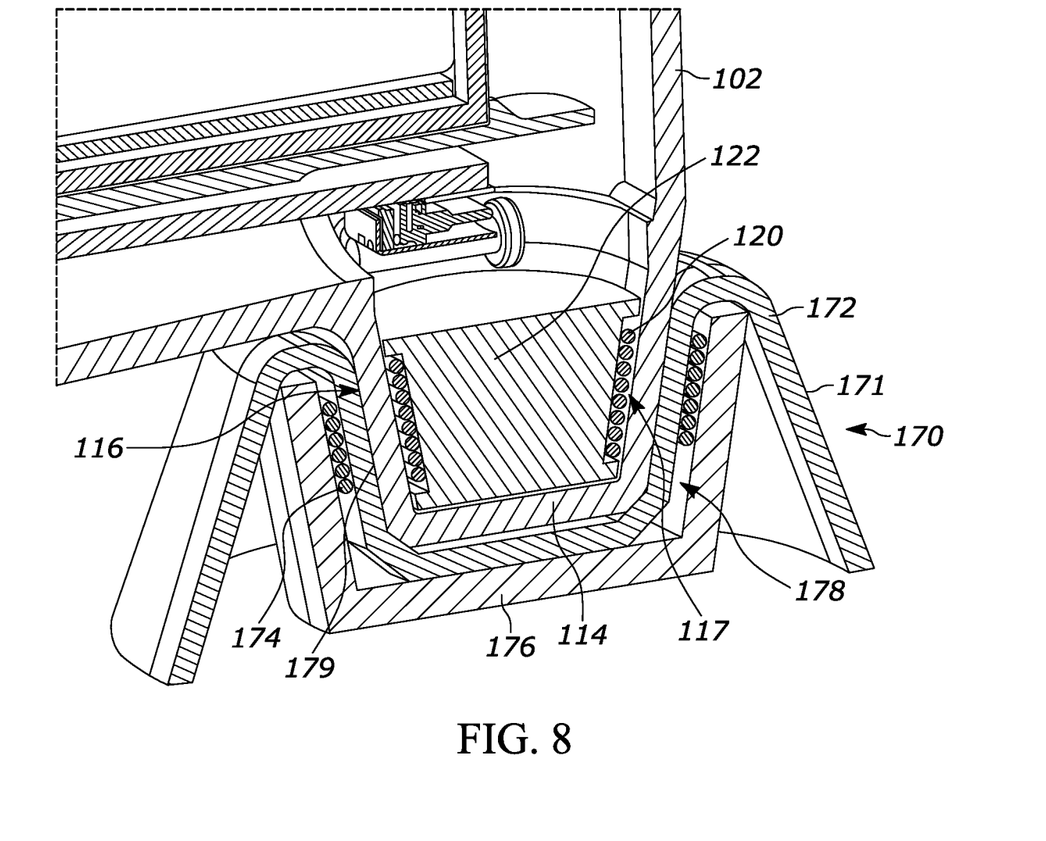
FIG. 8 illustrates a perspective cross-sectional view of a portion of the example assembly of FIGS. 1-7 whereby the example reader is coupled with the example cradle in accordance with various embodiments.

As previously stated, the tapered foot region 116 of the reader 102 may be removably coupled with the corresponding tapered body region 146 of the cradle 140. More specifically, as illustrated in FIGS. 1 & 8, when the reader 102 is coupled with and retained by the cradle 140, the tapered foot region 116 forms a nesting arrangement with the tapered body region 146. Accordingly, the first and second coils 120, 150 also form a nesting configuration. While the illustrated examples depict the tapered foot region 116 nesting within the tapered body region 146 (and thus the first coil 120 nesting within the second coil 150), in other examples (not illustrated), the tapered body region 146 may nest within the tapered foot region 116 (and thus the second coil 150 nesting within the first coil 120) in an inversed arrangement. Further, as these figures illustrate, the first and second coils 120, 150 each extend at an oblique angle relative to the insertion axis AI when the reader 102 is retained within the cradle 140. In some examples, the angle formed may be between approximately 20° and 75°. Other examples are possible.

In the illustrated examples, the cradle 140 provides and transmits an electrical charge to the reader 102 via induction charging. The second coil 150 of the cradle 140 generates an oscillating electromagnetic field in response to an alternating current applied thereacross. When the reader 102 is physically interfaced with the cradle 140, the first coil 120 of the reader 122 is aligned with the second coil 150 of the cradle 140 and exposed to the electromagnetic field generated by the second coil 150. The first coil 120 of the reader 102 then carries an induced current in response to being exposed to the oscillating electromagnetic field, and the induced current is used to electrically charge the rechargeable power source 112.

In a charging position, that is, when the reader 102 is inserted into the cradle 140, the respective tapered regions 116, 146 position and align the reader 102 relative to the cradle 140. As a result, a gap (e.g., a z-gap) between the first coil 120 and the second coil 150 is minimized when the reader 102 is in a charging position. This is achieved by a combination of gravity acting on the reader 102 and the tapered alignment features of the reader 102 and/or the cradle 140. Such alignment allows for increased charging efficiency of the coils. As an example, the first and second coils 120, 150 may cooperate to transmit an electrical charge of at least approximately 75% efficiency across a supplied power output between approximately 2 W and 5 W.

As previously noted, and with reference to FIG. 8, in some examples, an adapter plate 170 may be provided that is attachable to a cradle. Such an adapter plate 170 may enable enhanced and/or more efficient inductive charging to be achieved in existing cradle units. The adapter plate 170 may include a body portion 171 defining a baseplate 172, a coil 174, and a coil base 176. The baseplate 172 may be positionable on or otherwise coupled with a cradle via any number of suitable approaches (e.g., via fasteners, a friction-fit connection, a threaded connection, and the like). Like the second coil 150, the coil 174 is positionable within or around (e.g., internally or externally) a portion of the baseplate 172. More specifically, the coil 174 may be positioned about a tapered body region 178. In the illustrated examples, the coil 174 lines or is disposed adjacent to a surface of a wall 179 of the tapered body region 178. As with the second coil 150, the coil 174 may be wire wound any number of times and may have a coil diameter between approximately 25 mm and approximately 40 mm and a coil height between approximately 20 mm and approximately 30 mm. Other examples are possible.

The coil 174 may be carried by a coil base 176. In some examples, the coil 174 may be wound or otherwise wrapped within or about the coil base 176, which also may have a tapered arrangement. In some examples, the coil base 176 may include any number of channels, grooves, or other guides to assist with proper placement of the coil 174 thereon. The adapter plate 170 may include any number of features or components needed to couple the coil 174 with the power source used to generate an oscillating electromatic field in response to an alternating current applied thereacross. It is to be appreciated that in some examples, the adapter plate 170 may be dimensioned to receive a portion of the tapered foot region as described herein above, or a different portion of the reader (e.g., a tapered head region; as will be described below with respect to FIG. 10).

Numerous other arrangements of a barcode reader and cradle assemblies may be provided that improve inductive charging capabilities. Such arrangements may share any number of the features previously described with respect to barcode reader and cradle assembly 100. Common features are identified in each of the subsequent arrangements by the same reference number increased by a factor of one hundred. For example, the reader of the barcode reader and cradle assembly 100 is identified by reference number 102, whereas the reader of an alternative arrangement is identified by reference numbers 202 and 302. Unless otherwise stated, features that share this common numbering scheme are interchangeable between various arrangements. To avoid duplicative descriptions, interchangeable features are not described with respect to FIGS. 9 and 10.

As previously stated, FIG. 9 illustrates a reader and cradle assembly 200 that may be used in a vertical orientation. In some examples, such an orientation may accommodate presentation readers. The improved reader and cradle assemblies described herein allow for more efficient inductive charging, and as such, may allow for higher-powered readers to be implemented while still being capable of maintaining desired power levels.

Figure 10:
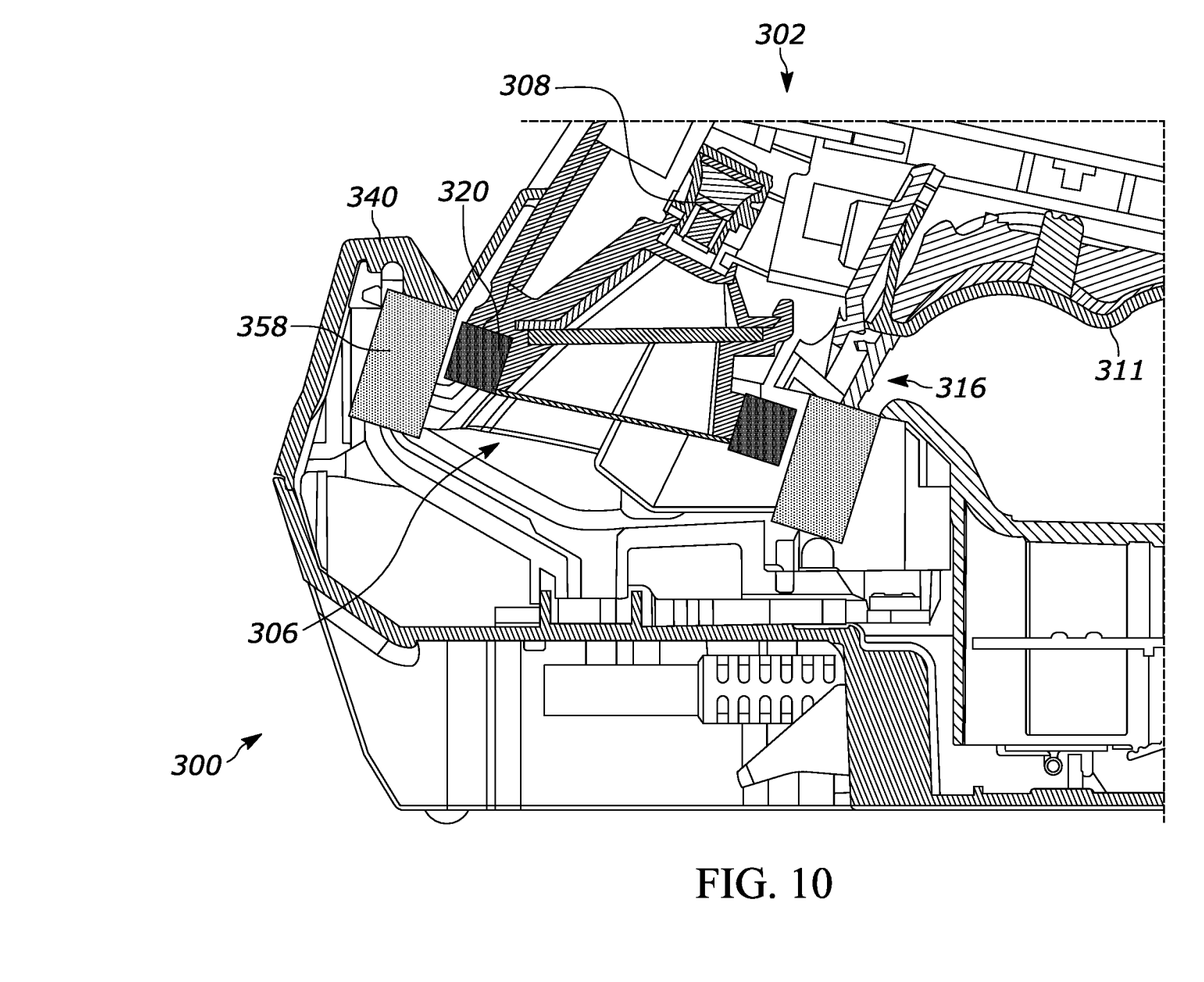
FIG. 10 illustrates a side elevation cross-sectional view of an alternative barcode reader and cradle assembly in accordance with various embodiments.

FIG. 10 illustrates a barcode reader and cradle assembly 300 where the charging portions are located in the head portion 306 of the reader 302. Accordingly, the portion of the cradle 340 that contains the second coil 350 is dimensioned to receive the head portion 306. In these examples, the reader 302 includes a tapered head region 316 and the cradle 340 includes a corresponding tapered body region 346 that defines an insertion axis AI'. As such, the head portion 306 and the tapered body region 146 form a nesting arrangement whereby the first and second coils 320, 350 are nested within each other. Because the head portion 306 of the reader 302 is typically larger than the foot portion, the corresponding first and second coils 320, 350 may be larger, thereby allowing for increased recharging speeds and/or capabilities.

So arranged, the reader and cradle assemblies described herein may properly position and align the reader within the cradle. As a result, when the reader is retained by the cradle, proper alignment between these components is maintained, which provides the additional benefit of ensuring the respective inductive coils are aligned to allow for efficient power transmission and charging. The approaches described herein may allow for existing cradles to be retrofitted with such improved charging mechanisms.

The above description may refer to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A barcode reader and cradle assembly for inductive charging, the barcode reader assembly comprising:
   a reader for capturing at least one image of an object appearing in an imaging field of view (FOV), the reader including:
      a head portion including an opening at least partially defining the FOV,
      a handle portion coupled with the head portion,
      a foot portion coupled with the handle portion, the foot portion forming a tapered foot region,
      a rechargeable power source coupled with the reader and adapted to be electrically charged and to supply an electric charge to power the reader, and
      a first coil positioned within or around the tapered foot region, the first coil being coupled with the rechargeable power source;
   a cradle for selectively retaining the reader, the cradle including:
      a body portion including a tapered body region, and
      a second coil positioned within or around the tapered body region, the second coil adapted to generate an oscillating electromagnetic field in response to an alternating current applied across the second coil;
   wherein the tapered foot region of the foot portion of the reader is adapted to removably couple with the tapered body region of the body portion of the cradle to retain the reader such that when the reader is retained within the cradle, at least one of the first coil or the second coil is nested within the other of the second coil or the first coil, wherein the first coil is adapted to carry an induced current in response to being exposed to the oscillating electromagnetic field, the induced current carried through the first coil being used to electrically charge the rechargeable power source.

2. The barcode reader and cradle assembly of claim 1, wherein the tapered body region of the cradle defines an insertion axis, wherein the first coil and the second coil each extend at an oblique angle relative to the insertion axis when the reader is retained within the cradle.

3. The barcode reader and cradle assembly of claim 1, wherein the first coil lines at least a portion of a wall of the tapered foot region.

4. The barcode reader and cradle assembly of claim 1, wherein the tapered foot region of the foot portion of the reader and the tapered body region of the body portion of the cradle form a nesting arrangement when coupled together.

5. The barcode reader and cradle assembly of claim 1, wherein the tapered foot region of the foot portion of the reader is adapted to nest within the tapered body region of the body portion of the cradle.

6. The barcode reader and cradle assembly of claim 5, wherein the tapered body region of the body portion of the cradle is adapted to nest within the tapered foot region of the foot portion of the reader.

7. The barcode reader and cradle assembly of claim 1, further comprising a first coil retention member adapted to retain the first coil against a sidewall of the tapered foot region.

8. The barcode reader and cradle assembly of claim 1, wherein the first coil includes a solid ferrite core.

9. The barcode reader and cradle assembly of claim 1, wherein the second coil and the first coil cooperate to transmit an electrical charge of at least approximately 75% efficiency across a supplied power output between approximately 2 W and 5 W.

10. A barcode reader and cradle assembly for inductive charging, the barcode reader assembly comprising:
a reader for capturing at least one image of an object appearing in an imaging field of view (FOV), the reader including:
a handle portion,
a foot portion coupled with the handle portion,
a head portion coupled with the handle portion, the head portion including an opening at least partially defining the FOV and a tapered head region extending around a periphery of the opening,
a rechargeable power source coupled with the reader and adapted to be electrically charged and to supply an electric charge to power the reader,
a first coil positioned within or around the tapered head region, the first coil being coupled with the rechargeable power source;
a cradle for selectively retaining the reader, the cradle including:
a body portion including a tapered body region, and
a second coil positioned within or adjacent to the tapered body region, the second coil further being adapted to generate an oscillating electromagnetic field in response to an alternating current applied across the second coil;
wherein the tapered head region of the head portion of the reader is adapted to removably couple with the tapered body region of the body portion of the cradle to retain the reader such that when the reader is retained within the cradle, at least one of the first coil or the second coil is nested within the other of the second coil or the first coil, wherein the first coil is adapted to carry an induced current in response to being exposed to the oscillating electromatic field, the induced current carried through the first coil being used to electrically charge the rechargeable power source.

11. The barcode reader and cradle assembly of claim 10, wherein the tapered body region of the cradle defines an insertion axis, wherein the first coil and the second coil each extend at an oblique angle relative to the insertion axis when the reader is retained within the cradle.

12. The barcode reader and cradle assembly of claim 10, wherein the first coil lines at least a portion of a wall of the tapered head region.

13. The barcode reader and cradle assembly of claim 10, wherein the tapered head region of the head portion of the reader and the tapered body region of the body portion of the cradle form a nesting arrangement when coupled together.

14. The barcode reader and cradle assembly of claim 13, wherein the tapered head region of the head portion of the reader is adapted to nest within the tapered body region of the body portion of the cradle.

15. The barcode reader and cradle assembly of claim 13, wherein the tapered body region of the body portion of the cradle is adapted to nest within the tapered head region of the head portion of the reader.

16. The barcode reader and cradle assembly of claim 10, further comprising a first coil retention member adapted to retain the first coil against a sidewall of the tapered head region.

17. The barcode reader and cradle assembly of claim 10, wherein the first coil includes a solid ferrite core.

18. The barcode reader and cradle assembly of claim 10, wherein the second coil and the first coil cooperate to transmit an electrical charge of at least approximately 75% efficiency across a supplied power output between approximately 2 W and 5 W.

\* \* \* \* \*